United States Patent
Arndt et al.

(10) Patent No.: US 9,546,716 B2
(45) Date of Patent: Jan. 17, 2017

(54) ADJUSTING DRIVE AND METHOD FOR PRODUCING AN ADJUSTING DRIVE

(75) Inventors: Thomas Arndt, Monheim (DE); Manfred Strzodka, Essen (DE); Tony Philip, Ann Arbor, MI (US); Tamas Poczik, Cologne (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 577 days.

(21) Appl. No.: 14/001,852

(22) PCT Filed: Feb. 15, 2012

(86) PCT No.: PCT/EP2012/052606
§ 371 (c)(1),
(2), (4) Date: Nov. 8, 2013

(87) PCT Pub. No.: WO2012/116892
PCT Pub. Date: Sep. 7, 2012

(65) Prior Publication Data
US 2014/0298938 A1    Oct. 9, 2014

(30) Foreign Application Priority Data

Feb. 28, 2011   (DE) .......................... 10-2011-000972
Apr. 12, 2011   (DE) .......................... 10-2011-001971

(51) Int. Cl.
*F16H 25/20*   (2006.01)
*B29C 65/08*   (2006.01)
(Continued)

(52) U.S. Cl.
CPC ......... *F16H 25/2003* (2013.01); *B23K 20/002* (2013.01); *B60N 2/067* (2013.01);
(Continued)

(58) Field of Classification Search
CPC ............ F16H 57/02; F16H 2057/02017; F16H 2057/02021; F16H 2057/02082; F16H 2057/02013; F16H 57/023; F16H 57/031; F16H 25/2003; F16H 2025/2031; F16C 17/08
(Continued)

(56) References Cited

U.S. PATENT DOCUMENTS 3,549,218 A    12/1970   Cagnon et al.
3,848,477 A    11/1974   Giandinoto et al.
(Continued)

FOREIGN PATENT DOCUMENTS

DE   195 20 886 C1   10/1996
DE   198 54 535 A1   6/2000
(Continued)

OTHER PUBLICATIONS

Office Action dated Oct. 7, 2014, in corresponding Japanese Application No. 2013-555817, 2 pages.
(Continued)

*Primary Examiner* — William Kelleher
*Assistant Examiner* — Bobby Rushing, Jr.
(74) *Attorney, Agent, or Firm* — Foley & Lardner LLP

(57) ABSTRACT

An adjusting drive, in particular for a steering column adjuster or a vehicle seat of a motor vehicle, and a method for producing an adjusting drive, are provided in which an axial play of the output shaft is reliably and permanently compensated. The compensating element for ensuring the axial-play-free arrangement of the output shaft is connected, in its operating position, to the housing by ultrasound welding.

10 Claims, 5 Drawing Sheets

(51) Int. Cl.
*H02K 7/06* (2006.01)
*B60N 2/06* (2006.01)
*F16H 25/24* (2006.01)
*B23K 20/00* (2006.01)
*F16H 57/12* (2006.01)
*B29C 65/56* (2006.01)
*B29C 65/00* (2006.01)

(52) U.S. Cl.
CPC ............ *F16H 25/24* (2013.01); *H02K 7/06* (2013.01); *B29C 65/08* (2013.01); *B29C 65/564* (2013.01); *B29C 66/1122* (2013.01); *B29C 66/126* (2013.01); *B29C 66/21* (2013.01); *B29C 66/81429* (2013.01); *F16H 2025/2031* (2013.01); *F16H 2057/125* (2013.01); *Y10T 74/19623* (2015.01)

(58) Field of Classification Search
USPC ...................................................... 74/89.37
See application file for complete search history.

(56) References Cited

U.S. PATENT DOCUMENTS

| | | | |
|---|---|---|---|
| 5,485,044 A | 1/1996 | MacKay et al. | |
| 6,805,024 B1 | 10/2004 | Shufflebarger et al. | |
| 7,116,025 B2 * | 10/2006 | Myerly | H02K 7/081 310/83 |
| 7,467,565 B2 * | 12/2008 | Oberle | F16C 17/08 74/409 |
| 2003/0172761 A1 | 9/2003 | Marcel | |
| 2005/0134131 A1 | 6/2005 | Myerly et al. | |
| 2009/0206644 A1 | 8/2009 | Ishii et al. | |

FOREIGN PATENT DOCUMENTS

| | | |
|---|---|---|
| DE | 10 2005 046354 A1 | 3/2007 |
| DE | 10 2006 049 808 A1 | 4/2008 |
| DE | 10 2006 049 809 A1 | 4/2008 |
| DE | 10 2007 021 268 A1 | 11/2008 |
| EP | 0 563 410 A1 | 10/1993 |
| EP | 1 546 576 | 6/2005 |

OTHER PUBLICATIONS

International Preliminary Report on Patentability mailed Sep. 12, 2013, as received in corresponding International Patent Application No. PCT/EP2012/052606.

International Search Report dated Jun. 6, 2012 as received in International Application No. PCT/EP2012/052606.

* cited by examiner

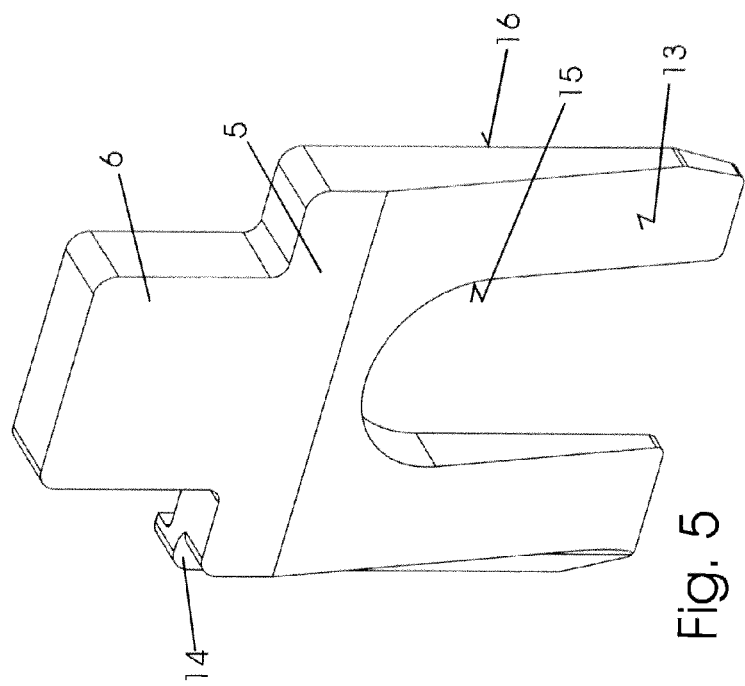
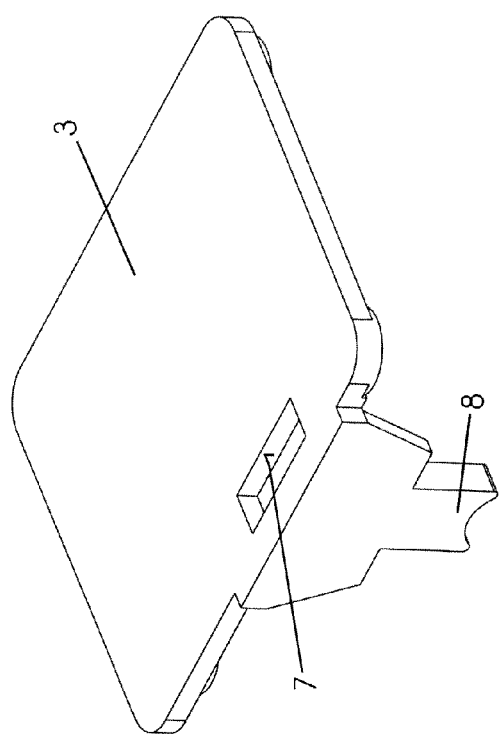
Fig. 5
Fig. 4

ADJUSTING DRIVE AND METHOD FOR PRODUCING AN ADJUSTING DRIVE

CROSS REFERENCE TO RELATED APPLICATIONS

The present application is a U.S. National Stage of International Application No. PCT/EP2012/052606 filed on Feb. 15, 2012, which claims the benefit of German Patent Application No. 10 2011 000 972.8 filed on Feb. 28, 2011 and German Patent Application No. 10 2011 001 971.5 filed on Apr. 12, 2011, the entire disclosures of all of which are incorporated herein by reference.

The invention relates to an adjusting drive as well as a method to produce an adjusting drive, in particular for a steering column adjuster or a vehicle seat of a motor vehicle, comprising:
  a housing,
  an output shaft rotatably mounted in the housing, and
  a wedge-shaped compensating element to prevent axial play of the output shaft,
wherein the compensating element, in its operating position, is braced against the housing and an axial stop of the output shaft.

Adjusting drives of the initially-cited kind are used in a variety of embodiments in motor vehicles for the motorized adjustment of various vehicle components, and they enable, for example, the vehicle control devices, seat positions, etc. to be adapted to the respective passengers. Adjusting drives of the initially-cited kind are accordingly used within the area of motor vehicle seats, among other things, to adjust the various seat components as well as to adapt the position of the steering column to the respective driver.

In order to offer a comfortable and reliable means of adjustment and prevent unpleasant clicking noises when the direction of the output shaft reverses, it is necessary to compensate the axial play of the output shaft so that it engages substantially free of play with the vehicle component to be adjusted.

A generic adjusting drive is known from DE 198 54 535 A1 for a windshield wiper system of a motor vehicle in which the axial play of the output shaft is compensated by means of a tapered slide that presses radially against an axial stop of the armature shaft and thereby axially shifts the output shaft. The necessary displacement force acting on the tapered slide is applied by a spring element that presses the tapered slide toward the output shaft. Due to the high continuous load on the spring element, the elastic properties attenuate over the overall life, whereby the axial play is no longer reliably compensated, and the output shaft can move back and forth, especially under a load.

The object of the invention is to provide an adjusting drive as well as a method to produce an adjusting drive of the initially-cited kind, in which axial play of the output shaft is reliably and lastingly compensated.

The object of the invention is achieved by an adjusting drive having the features of claim 1 and by a method having the features of claim 13. Advantageous further developments of the invention are given in the dependent claims.

It is characteristic of the adjusting drive according to the invention that the compensating element to ensure the axial-play-free arrangement of the output shaft is connected in its operating position to the housing by means of ultrasonic welding. To be understood as the "operating position" in the context of the invention is the position of the compensating element in which it fixes the output shaft in the housing in an axial-play-free arrangement that reliably prevents the vehicle components adjusted by the adjusting drive from being adjusted with play, or reliably prevents unpleasant noise while operating the adjusting drive.

According to the invention, the compensating element is moved into a position relative to the output shaft in which the compensating element lies against both the housing as well as an axial stop of the output shaft so that the output shaft no longer has axial play. To secure this operating position of the compensating element, the compensating element in this position relative to the housing is joined to the housing by means of ultrasonic welding. The housing as well as the compensating element are made of a plastic, at least in the region of the ultrasonic weld connection, wherein both the housing as well as the compensating element can be entirely made of plastic.

The ultrasonic weld connection stands out by its reliable, inseparable connection of the housing to the compensating element, and permanent fixation of the compensation element on the housing, and hence relative to the output shaft, is thereby achieved. In addition, the ultrasonic weld can be created economically at a fast welding speed and easily and cheaply. The thermoplastic plastic of the compensating element and housing are melted at the region of contact and joined during the hardening process to yield a secure compensating element arrangement in operating position.

Overall, the adjusting drive according to the invention possesses an axial output shaft that is arranged free of axial play over the entire life, wherein, in particular, connecting the compensating element to the housing by means of ultrasonic welding, which permanently fixes the operating position, reliably ensures that the play-free arrangement is also retained over the entire life of the adjusting drive.

In order to compensate for the axial play, the compensating element, in its operating position, abuts both the housing as well as an axial stop of the output shaft and hence secures the play-free arrangement of the output shaft thereby achieved. The compensating element can interact at any position with an axial stop of the output shaft, wherein the axial stop can for example be formed by a shaft end, wherein the compensating element is then arranged between the end of the shaft and the housing.

According to a particularly advantageous embodiment of the invention, the compensating element has a U-shaped seat opening, however, that encompasses the output shaft in the region of a shaft shoulder forming an axial stop. According to this embodiment of the invention, a shaft shoulder that can be formed in any shape such as a pinion arranged on the shaft extending radially from the output shaft and running substantially perpendicular to the shaft axis forms an axial stop against which the compensating element lies in its operating position. To enable a particularly favorable arrangement of the compensating element relative to the output shaft, the compensating element has a U-shaped seat opening with an opening cross-section that is adapted to the diameter of the output shaft in the region of the compensating element mounted in operating position.

A corresponding further embodiment of the invention ensures a highly positionally stable arrangement of the compensating element relative to the output shaft in the selected operating position as well as in a pre-mounted position in which the compensating element must be shoved radially toward the compensating shaft into the operating position to achieve an axial play-free arrangement of the output shaft. In addition, the U-shaped seat opening enables the compensating element to be securely mounted on the output shaft, and reduces stresses acting on the compensating element that arise during operation.

The compensating element can abut the housing at any desired location. It is for example conceivable to design the compensating element such that the compensating element abuts a suitable area of the housing with a section that is radially offset relative to the axial stop. However, according to a particularly advantageous embodiment of the invention, the compensating element in operating position abuts a contact surface of the housing with a support surface facing away from the axial stop. According to this embodiment of the invention, the compensating element extends in a region between two opposing surfaces, that is, of the housing and the axial stop. A support surface of the compensating element abuts a contact surface of the housing, and the axial stop of the output shaft abuts a contact surface of the compensating element, thereby guaranteeing in a particularly reliable manner the axial-free bearing of the output shaft when the compensating element is in its operating position. When in operating position, the compensating element has shifted the output shaft by the axial stop into a position free of axial play, wherein the support surface of the compensating element abuts the housing on the side opposite the axial stop.

The wedge-shaped design of the compensating element is essential to its function. Depending on the radial position of the compensating element relative to the output shaft, the distance between the housing and an axial stop can be adjusted by the compensating element. In general, the use of a wedge-shaped compensation element is sufficient for it to perform its function in the adjusting drive according to the invention, wherein a partially linear connection between the compensating element and the axial stop and/or the associated contact surface can, however, exist in the housing due to the wedge-shaped design.

According to an advantageous further embodiment of the invention, it is therefore provided that the contact surface is contrarily at an angle relative to a plane running vertically to the output shaft corresponding to the wedge shape of the compensating element. According to this embodiment of the invention, the contact surface of the housing that interacts with the compensating element in the operating position is angled corresponding to the wedge angle of the compensating element, wherein the path is such that the surface narrows toward the direction of insertion of the compensating element. When the compensating element is in operating position at the output shaft, this yields a flat contact by the compensating element against the axial stop and against the contact surface of the housing. This ensures an axial-play-free arrangement in a particularly reliable manner that is sustained over the entire life of the adjusting drive.

In general, the contact surface can be designed with an angled shape corresponding to the compensating element in any desired manner. A mounted part connected to the housing wall can be arranged on the housing in the region of the contact surface. According to a particularly advantageous embodiment of the invention, the contact surface is, however, formed integrally with the housing. The adjusting drive can hence be produced particularly easily and economically in a correspondingly developed form since additional assembly effort to provide a correspondingly angled contact surface can be dispensed with.

The compensating element can be arranged in any manner whatsoever relative to the output shaft, i.e., in particular the radial adjustment of the compensating element during preassembly towards the output shaft into the operating position in which the compensating element bears the output shaft in a play-free position. According to one particularly advantageous embodiment of the invention, an actuating section of the compensating element, in particular a projection projecting radially relative to the output shaft, extends out of a housing opening, however.

According to this embodiment of the invention, in which the actuating section preferably has a cross-section that is less than the remaining compensating element, the adjusting drive can be easily preassembled at the housing with the compensating element which already secures the compensating element in an initial position relative to the output shaft and housing. The compensating element is then shifted in a radial direction as a result of force acting on the actuating section, which shifts the compensating element toward the output shaft. In operating position, the compensating element can be connected to the housing by means of ultrasonic welding while retaining the set operating position. Extensive measures to secure the position of the compensating element in its operating position before welding can thereby be avoided. It is particularly advantageous to provide the actuating section with a predetermined breaking point that makes it easy, after the compensating element is connected to the housing, to remove sections of the compensating element that project from the housing which may in certain circumstances be annoying by simply snapping off, knocking off, breaking off, etc.

In general, the compensating element can be connected to the housing at any desired location. According to a particularly advantageous embodiment of the invention, the compensating element is, however, connected to the housing cover by means of ultrasonic welding. This connection is particularly easy to produce and makes it possible to provide the housing cover with a section prepared for connecting which can be done quite easily and economically in comparison to correspondingly designing the entire housing.

To prevent the compensating element from being incorrectly assembled relative to the output shaft, especially when the contact surface in the housing has an angled shape corresponding to the compensating element, the compensating element is designed in another embodiment of the invention in a manner that makes it impossible to misalign the compensating element relative to the output shaft. This ensures a predetermined arrangement of the compensating element in a particularly reliable manner. Generally, any design is possible, yet it is particularly advantageous when the compensating element has a contour for aligning it which gives the compensating element an asymmetrical shape that only permits a single installation position when the housing has a corresponding design. Projections, bars or elevations can be provided as the contour that preferably extend along one side of the compensating element.

In general, the connection of the compensating element to the housing made by ultrasonic welding already satisfies the stability requirements for resisting the arising stress, thus allowing the output shaft to be reliably arranged free of axial play.

According to a particularly advantageous embodiment of the invention, a safety bolt is embedded in the housing in the region of the ultrasonic weld, preferably embedded in the housing cover and the compensating element. A safety bolt according to this embodiment of the invention extending through the housing as well as the compensating element, or at least portions of these components, secures the position of the compensating element relative to the output shaft as well as the housing in a supplementary manner.

Arranging the safety bolt in the housing and compensating element before ultrasonic welding also ensures that, in addition to a friction and/or keyed connection, there is an integral connection after welding between the safety bolt, the housing and the compensating element after the plastic melts during ultrasonic welding and bonds the safety bolt integrally with the housing and compensating element. Using a safety bolt increases the shear resistance of the compound structure so that greater shearing loads can be transmitted by the safety bolt.

Any safety bolt design can be chosen, wherein the safety bolt can in general be formed by a simple cylindrical pin that for example can be arranged in an advantageously provided hole in the compensating element and/or housing before performing ultrasonic welding.

However, according to a particularly advantageous embodiment of the invention, the safety bolt has an end section that narrows toward the compensating element, and/or a cross-section that changes in the direction of the longitudinal axis, and/or a cross-section that deviates from a circular shape. According to this embodiment of the invention, the safety bolt can for example have a tip that forms the narrow end section which makes it easier to arrange the safety bolt.

To improve the stability of the compound structure consisting of a safety bolt, compensating element and housing, the safety bolt can have a cross-section that changes in the direction of the longitudinal axis, wherein the lateral surface has for example peripheral projections or a thread. As a result of this embodiment, as well as the axially extending bars or projections which cause the safety bolt to have a cross-section that differs from a circular shape, the safety bolt has a plurality of undercuts into which the plastified plastic flows during the welding process, which yields a particularly good connection.

According to a particularly advantageous embodiment of the invention, the safety bolt is designed to be coupled to an ultrasonic vibration generator and to transmit ultrasonic vibration into the housing and/or the compensating element. According to this embodiment of the invention, the safety bolt enables coupling or connecting to an ultrasonic vibration generator such as a sonotrode, and it is also designed to transmit ultrasonic vibrations into the housing and/or the compensating element.

According to this embodiment, the preferably metal safety bolt forms an extension of the sonotrode such that heat can be introduced in a targeted manner, which allows a particularly homogenous connection to be formed. Following the ultrasonic welding procedure, the sonotrode is disconnected from the safety bolt which then remains in the arranged position.

It is characteristic of the method according to the invention for producing an adjusting drive comprising:
 a housing,
 an output shaft rotatably mounted in the housing, and
 a wedge-shaped compensating element to prevent axial play by the output shaft,
wherein the compensating element, in its operating position, is braced against the housing and an axial stop of the compensating shaft, that the following methodical steps are executed to secure the operating position of the compensating element which fixes the axial-play-free arrangement of the output shaft:
 a safety bolt is releasably coupled to an ultrasonic vibration generator,
 the safety bolt is engaged with the housing and compensating element,
 ultrasonic vibrations are introduced via the safety bolt into the compensating element and the housing to plastify the plastic surrounding the safety bolt, and
 the safety bolt is disconnected from the ultrasonic vibration generator.

It is essential to the method according to the invention that the safety bolt serves to transmit ultrasonic vibration into the housing and compensating element to allow particularly effective melting of the plastic surrounding the safety bolt during the ultrasonic welding process, which generates a particularly homogenous and reliable connection between the housing, the compensating element and the safety bolt to very reliably secure the compensating element in its operating position in which it fixes the output shaft free of axial play.

The safety bolt can be connected to the ultrasonic vibration generator before as well as after the safety bolt is arranged in the housing and compensating element. After the safety bolt is positioned and coupled for example to a sonotrode, the ultrasonic vibration is transmitted from the ultrasonic vibration generator to the safety bolt. After the plastic surrounding the safety bolt is sufficiently plastified and after subsequent welding, the ultrasonic vibration generator is disconnected from the safety bolt after the ultrasonic welding procedure is finished. The releasable connection between the safety bolt and ultrasonic vibration generator can have any design whatsoever as long as the transmission of the ultrasonic vibrations is guaranteed.

It is always possible to design the safety bolt so that it can be inserted at any location into the housing and compensating element; it is conceivable in particular to design the safety bolt with a tip and/or a thread, a knurling, etc.

According to a particularly advantageous embodiment of the invention, the safety bolt is inserted into an opening, in particular a borehole, introduced previously in the housing and/or the compensating element to establish engagement with the housing, in particular the housing cover and compensating element.

This embodiment of the invention in which the opening can be in both components or just in one component makes it easier to arrange the safety bolt, or position the safety bolt, in the compensating element and housing. The penetration depth of the safety bolt is generally such that, when in an installed state, it does not project from the housing or compensating element, i.e., into the interior of the adjusting drive or from the outer wall.

According to a further development of the method, the ultrasonic vibrations are introduced over a predetermined time and/or up to a predetermined propagation in the plastic plastifying around the safety bolt to generate a particularly homogenous and reliable connection. This embodiment of the invention, wherein the duration to be set for generating ultrasound is generally based on empirical data, or the ultrasonic welding is governed by specifying the propagation of the plastifying plastic, makes it possible to create a particularly reliable connection, and the production method is particularly easy to perform given the established parameters.

The plastified plastic, which is to be understood as melted plastic, enables an integral connection between the housing, the compensating element and the safety bolt, and very reliably secures the position of the compensating element in its operating position. In addition, the plastified plastic can enter any available undercut existing from the design of the safety bolt that makes the connection particularly reliable.

An exemplary embodiment of the invention is explained in the following with reference to the drawings. In the figures:

FIG. 4 shows a perspective view of a housing cover of the housing of the adjusting device from FIG. 1;

FIG. 5 shows a perspective view of a compensating element of the adjusting device from FIG. 1;

Figure 1:
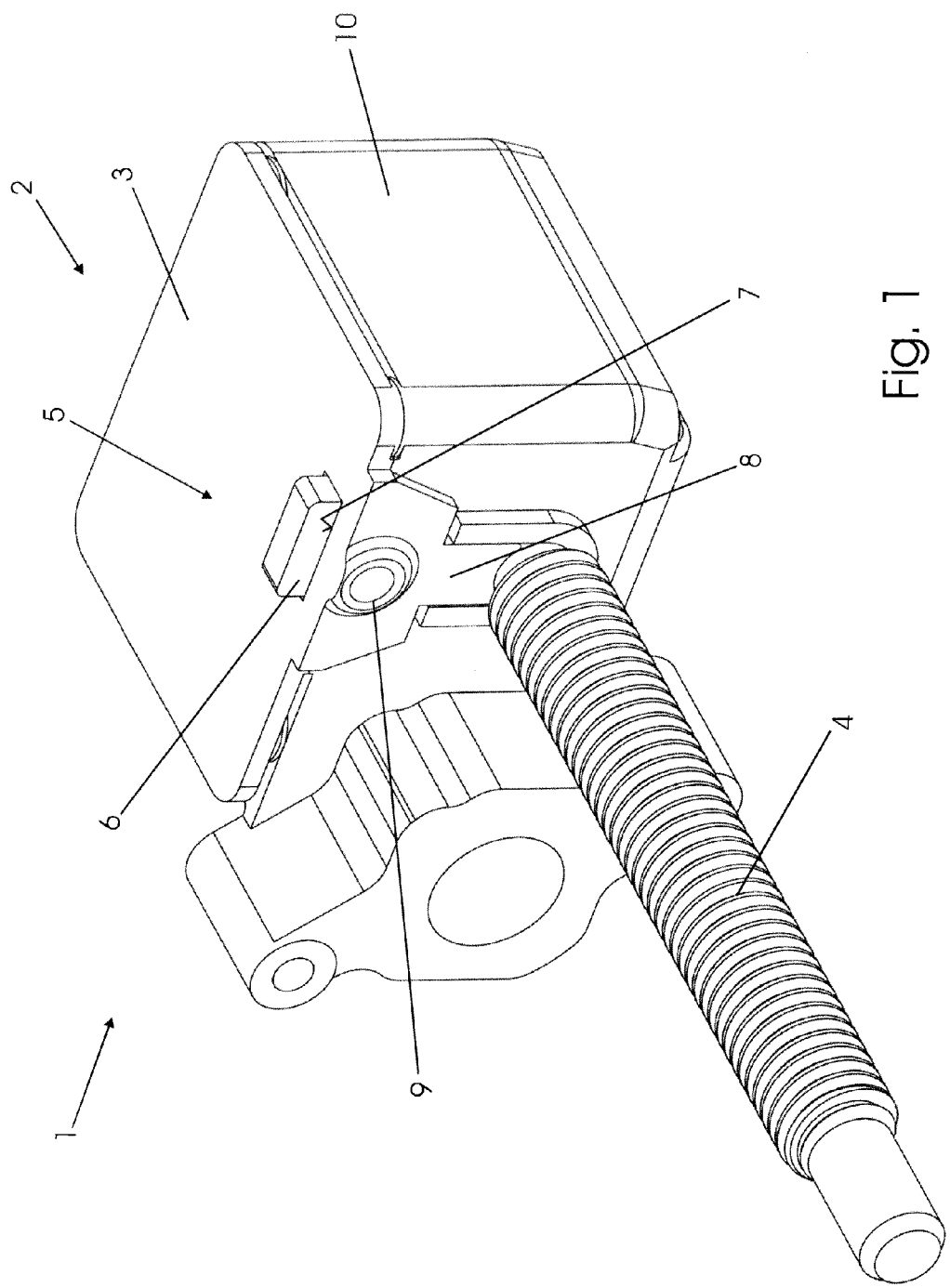
FIG. 1 shows a perspective view of an adjusting device with a housing and an output shaft extending out of the housing.
Figure 2:
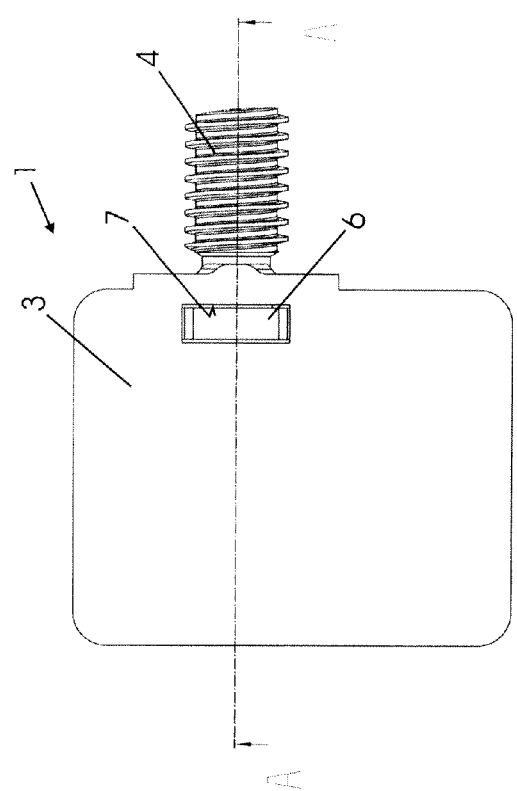
FIG. 2 shows a plan view of the adjusting device from FIG. 1.

An exemplary embodiment of an adjusting drive 1 as well as its components are portrayed in FIGS. 1 to 6. The adjusting drive 1 has a housing 2 formed by a main housing body 10 and a housing cover 3 on which an output shaft 4 of the adjusting drive 1 is rotatably mounted. The output shaft 4 that is connectable to an adjustable vehicle component (not shown) can be driven by means of a pinion 12 which is only sketched.

Figure 3:
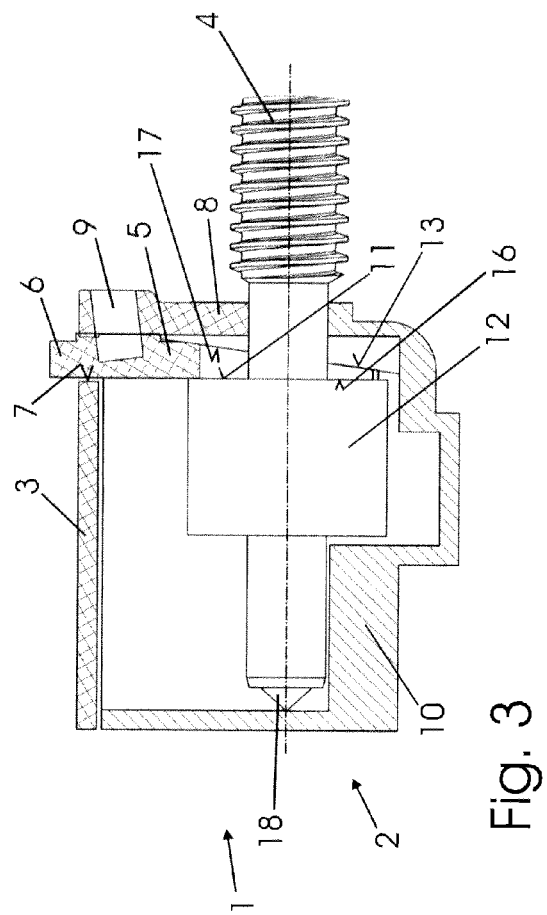
FIG. 3 shows a view of a section along intersecting line A-A from FIG. 2.
Figure 6:
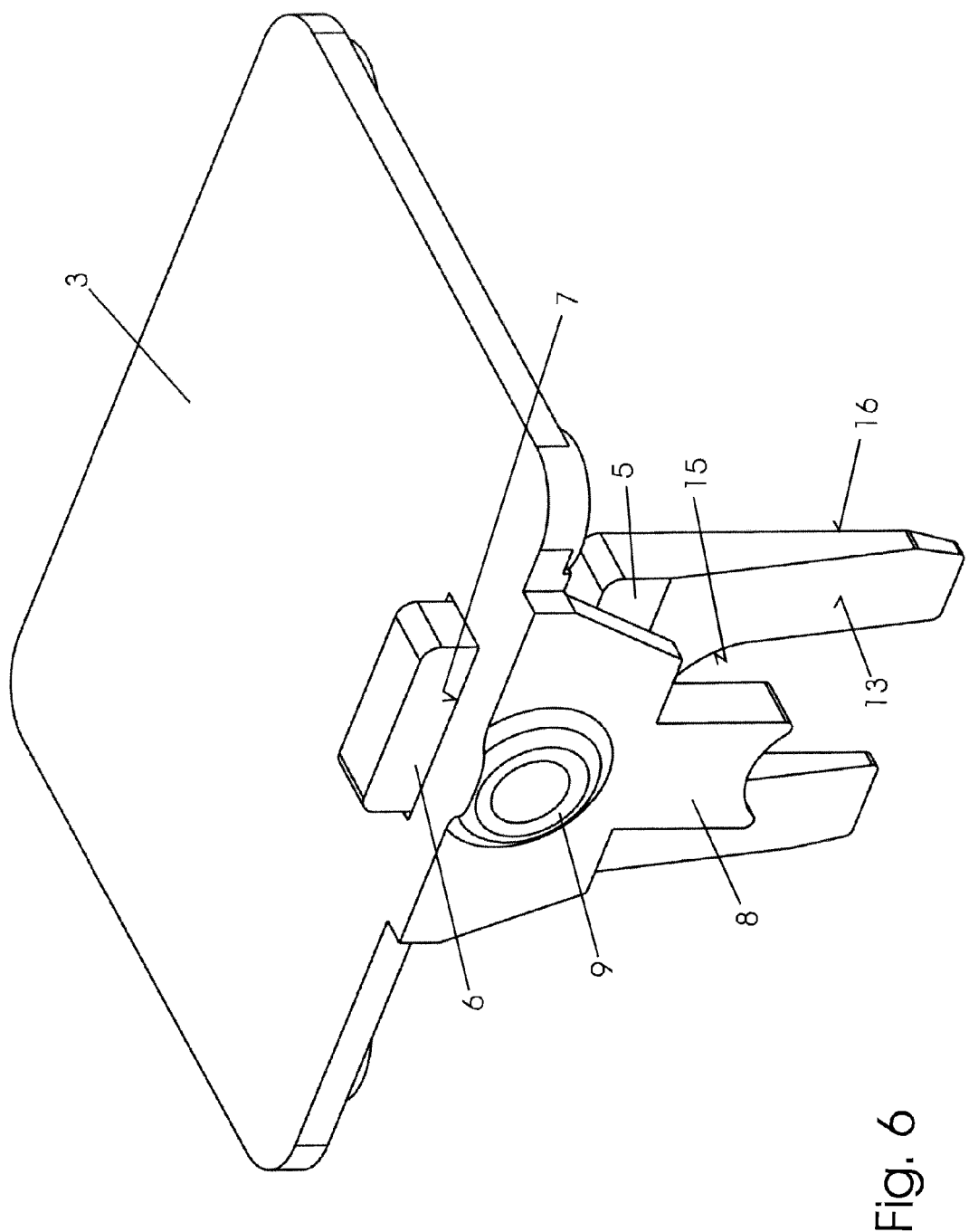
FIG. 6 shows a perspective view of the housing cover from FIG. 4 and the compensating element from FIG. 5 in an assembled position.
Figure 8:
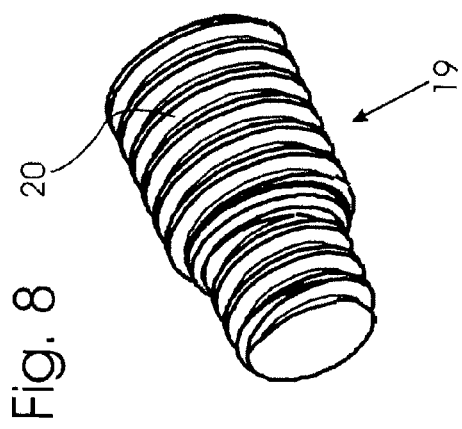
FIG. 8 shows a perspective view of the safety bolt from FIG. 7.

For an axial-play-free arrangement of the output shaft 4 in the housing 2 that is required for smooth operation, the adjusting drive 1 has a wedge-shaped compensating element 5 that, when in the operating position shown in FIGS. 1 and 3, secures the output shaft 4 in an axial-play-free position. A stop surface 16 of the compensating element 5 in an operating position lies against an axial stop 11 formed by the pinion 12, and a support surface 13 lies against an angled contact surface 17—corresponding to the wedge shape of the compensation element 5—of an interior of the main housing body 10, wherein to simultaneously achieve an axial-play-free arrangement of the output shaft 4, a conical, tapering support bearing 18 of the shaft end arranged within the housing 2 lies against the inner housing opposite the contact surface 17. The position of the output shaft 4 in an axial direction is determined as a function of the radial position of the wedge-shaped compensating element 5 relative to the output shaft 4 such that, by shifting the compensating element 5 in a radial direction, the output shaft 4 is moved into a play-free position.

The support bearing 18, like the region of the main housing body 10 against which the support bearing 18 lies against the inner housing wall, can have any design to achieve a secure position as well as minimal friction. Accordingly, the main housing body 10 can for example be provided in the region of the support 18 with a preferably metal thrust washer (not shown) that is separately attached to the main housing body 10 or embedded in it during its manufacturing process. Alternately to the portrayed conical design, the support bearing 18 can be formed by a sphere that is rotatably arranged on the shaft end.

To secure the operating position of the compensating element 5 relative to the housing 2, the compensating element 5 is connected by a bar 8 of the housing cover 3, that extends in a radial direction toward the output shaft 4, to the housing cover 3 by means of an ultrasonic welding point 9. The axial-play-free position of the output shaft 4 is secured by means of the positionally stable connection of the main housing body 10 and housing cover 3 that, jointly with the main housing body 10, forms the radial bearing of the output shaft 4 by an arc-shaped section of the bar 8 corresponding to the cross-section of the output shaft 4.

The position of the compensating element 5 on the output shaft 4 is determined, among other things, by a U-shaped seat-opening 15 that, in the operating position, extends in the region around the output shaft 4. A projection 6 serves to displace the compensating element out of an initial position into the operating position and, when viewed in a radial direction, extends on the side of the compensating element 5 opposite the U-shaped seat opening 15 and, when the compensating element 5 is in the pre-mounted and mounted position, projects through an opening 7 in the housing cover 3. In the pre-mounted position, the compensating element 5 can be shoved toward the output shaft 4 into the operating position—in which the compensating element 5 is permanently connected to the housing cover 3 by ultrasonic welding—by comfortably shifting the projection 6 that projects out of the housing opening 7 of the already mounted housing 2.

To achieve minimal friction between the axial stop 11 and the stop surface 16, they can be made for example from suitable materials or provided with low friction coatings. According to an embodiment not shown, a bearing, such as a ball bearing, can also be arranged between the pinion 12 and the compensating element 5 which enables particularly low-friction operation.

A contour 14 arranged on one side of the compensating element 5 that interacts with a corresponding recess in the housing 2 facilitates a single installation position of the compensating element 5 relative to the output shaft 4, thus ensuring that the support surface 13 comes into flat contact with a correspondingly angled contact surface 17 on an inner housing wall of the main housing body 8.

Figure 7:
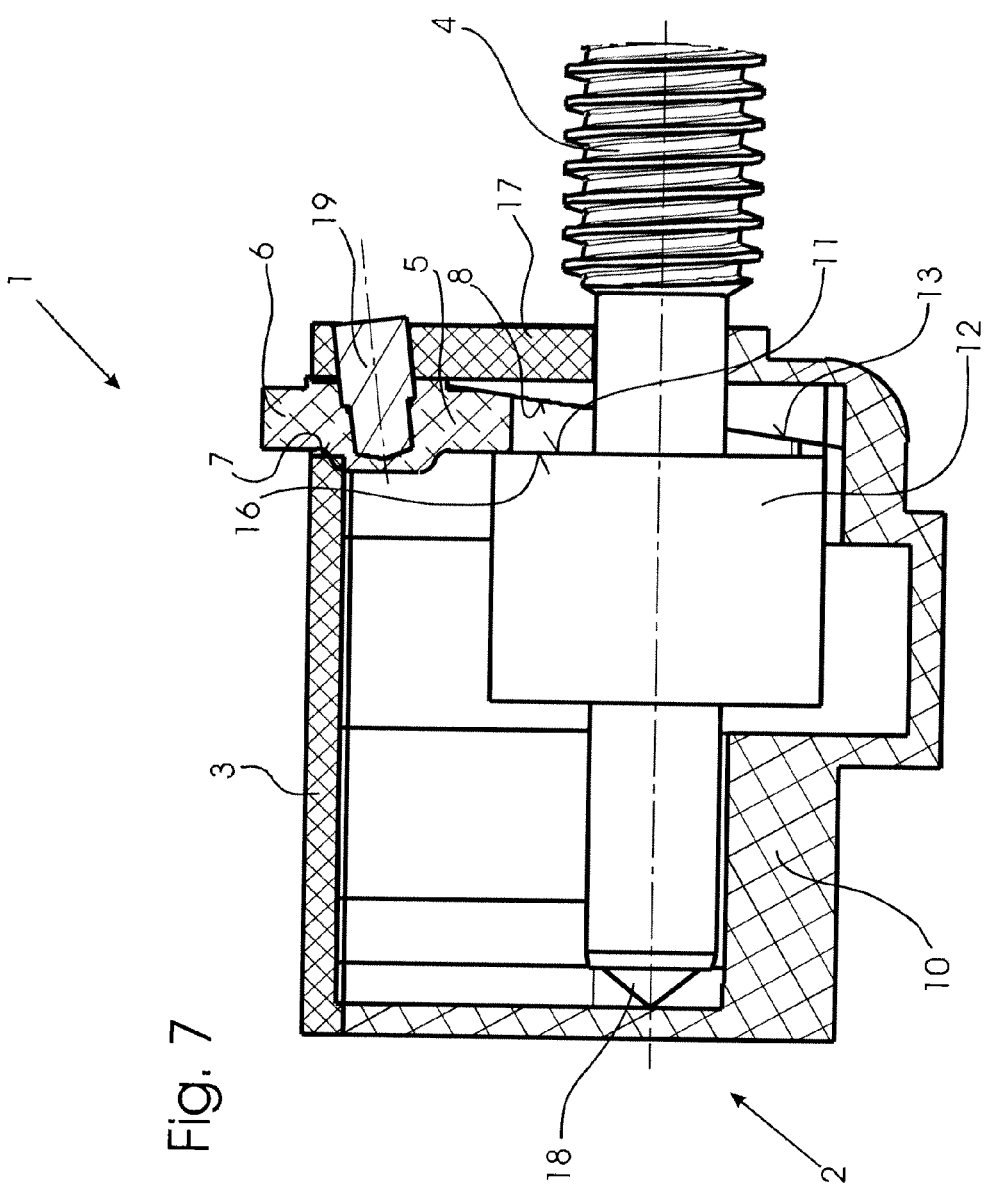
FIG. 7 shows a view of a section of an additional embodiment of an adjusting device with a safety bolt.

FIG. 7 shows a view of a section of an additional embodiment of an adjusting device 1 having a safety bolt 19, wherein the safety bolt 19 extends through the bar 8 of the housing 2 into the compensating element 5, such that the safety bolt 19 also secures the position of the compensating element 5 relative to the housing 2. The safety bolt 19 also serves to introduce ultrasonic vibrations into the compensating element 5 and the housing 2, which plastifies, i.e., melts, the region around the safety bolt 19, and ultrasonic welding occurs. To introduce ultrasonic vibration, the safety bolt 19 is coupled to a sonotrode (not shown) before or after being arranged in the housing 2 and the compensating element 5.

To ensure a particularly reliable arrangement of the safety bolt 19, it has a type of thread 20 on its perimeter, and the plastified plastic flows into its gaps during ultrasonic welding which, in addition to a keyed connection, also yields an integral connection of a particularly high quality.

During the ultrasonic welding process, the ultrasonic vibrations are converted into mechanical oscillation energy by means of a sound transducer. The heat required for plastification during ultrasonic welding is achieved by introducing mechanical oscillations, and these are fed to the components 5, 8, 19 to be welded under a controlled pressure of a sonotrode. Given its design, the connecting bolt 19 serves to introduce heat in a targeted manner, wherein heat is generated by molecular and interfacial friction on the flanks of the thread 20, in the region of which the plastic begins to melt, thus causing the plastified plastic to flow into the region between the flanks of the thread 20.

To enable an effective arrangement of the safety bolt, the housing cover 3 provided to be received on the housing 2 has a pilot hole which is adapted to the compensating element 5.

The invention claimed is:

1. An adjusting drive, comprising:
   a housing;
   an output shaft rotatably mounted in the housing; and
   a wedge-shaped compensating element to prevent axial play of the output shaft, wherein the compensating element, in an operating position, is braced against the housing and an axial stop of the output shaft,
   wherein the compensating element, in the operating position, is connected to the housing by ultrasonic welding to secure the axial-play-free arrangement of the output shaft,
   wherein the compensating element is connected to a cover of the housing by ultrasonic welding.

2. The adjusting drive according to claim 1, wherein the compensating element has a U-shaped seat opening that encompasses the output shaft in the region of a shaft shoulder forming an axial stop.

3. The adjusting drive according to claim 2, wherein the compensating element, in the operating position, has a support surface facing away from the axial stop that lies against a contact surface of the housing.

4. The adjusting drive according to claim 3, wherein, corresponding to the wedge shape of the compensating element, the contact surface is contrarily at an angle relative to a plane running vertical to the output shaft.

5. The adjusting drive according to claim 3, wherein the contact surface is formed integrally with the housing.

6. The adjusting drive according to claim 1, wherein the compensating element has an actuating section that extends out of a housing opening.

7. The adjusting drive according to claim 1, wherein the compensating element has a contour to align it.

8. The adjusting drive according to claim 1, wherein a safety bolt is embedded in the region of the ultrasonic weld in the housing.

9. The adjusting drive according to claim 8, wherein the safety bolt has at least one of an end section that narrows toward the compensating element and a cross-section that changes in the longitudinal axial direction, and a cross-section that deviates from a circular shape.

10. The adjusting drive according to claim 8, wherein the safety bolt is designed to be coupled to an ultrasonic vibration generator and to transmit ultrasonic vibrations into at least one of the housing and the compensating element.

* * * * *